United States Patent Office 2,938,798
Patented May 31, 1960

2,938,798
ICING COMPOSITION

Harry A. Toulmin, Jr., Dayton, Ohio, assignor to The Commonwealth Engineering Company of Ohio, Dayton, Ohio No Drawing. Original application Sept. 25, 1953, Ser. No. 382,479. Divided and this application Sept. 3, 1958, Ser. No. 758,659

9 Claims. (Cl. 99—139)

This invention relates to improvements in icings for use on bakery products.

Various types of icings are known the basic ingredients of which are sugar and water but which may comprise supplementary ingredients such as fats and shortenings, egg whites, skim milk powder, chocolate and flavoring ingredients as well as, in some cases, flour or cornstarch as a bodying agent. Some icings consist essentially of egg whites and sugar.

It is the common practice to include in the icing composition a stabilizer which improves the texture and appearance of the icing and may improve its keeping property.

Icings comprising flour, cornstarch or other known bodying agents are not entirely satisfactory, for one reason or another. Furthermore, the known stabilizers, such as alginic acid derivatives, are less effective than is desirable.

One object of this invention is to modify the basic icing compositions comprising sugar by inclusion therein of a bodying adjuvant which is also a stabilizer for the icing and which may contribute other desirable effects such as improved texture and appearance, a plasticity which facilitates application of the composition to cakes or the like, and which may serve as a medium for the oral ingestion of an agent which tends to retard the rate of absorption and assimilation of the sugar and hence tends to control or inhibit gain in body weight due to consumption of the sugar.

Another object is to provide an additive for icings which dispenses of the need to incorporate flour, cornstarch or the like in the icing for bodying or suspending purposes and which, therefore, eliminates the unpleasant starchy taste characteristic of some icings.

Those and other objects of the invention are accomplished by adding to the icing ingredients a relatively small amount of a dextran or edible dextran derivative which is physiologically harmless.

The dextrans are high molecular weight polysaccharides comprising anhydroglucopyranosidic units linked by molecular structural repeating alpha-1,6 and non-alpha-1,6 linkages, at least 50% of these linkages being, apparently, of the alpha-1,6 type. The dextrans, being hydroxyl-bearing materials, are more or less all inherently hydrophilic but may vary with respect to their molecular weight and molecular structural repeating alpha-1,6 to non-alpha-1,6 linkages ratios.

The dextrans which, in accordance with this invention, are incorporated in icing compositions of all types, for improvement in the texture and stability thereof, are those having a molecular weight in the range of 5,000 to $150 \times 10^6$ as determined by light scattering measurements, a molecular structural repeating alpha-1,6 to non-alpha-1,6 linkages ratio in the range between 1:1 and 30:1, and a solubility or dispersibility in water such that they form stable aqueous solutions or dispersions therein having a dextran concentration of from 0.5 to 50% by weight.

The dextrans may be obtained in various ways, as by enzymatic synthesis from sucrose in the presence or substantial absence of bacteria, by bacterial conversion of 1,4 linkages of dextrins to alpha-1,6 linkages of dextran, or in any other appropriate manner.

For instance, dextran suitable for incorporation in the icings or toppings with which the present invention is concerned may be obtained by inoculating a nutrient medium containing sucrose, particular nitrogenous compounds and certain inorganic salts with an appropriate microorganism, such as those of the Leuconostoc mesenteroides or L. dextranicum types, and incubating the inoculated medium at the temperature most favorable to the growth of the particular microorganism. Thus, in one method of obtaining dextran, a suitable aqueous nutrient medium which may have the following composition is prepared

| | Percent by weight |
|---|---|
| Sucrose | 5–10 |
| Corn steep liquor | 2.0 |
| Monobasic potassium phosphate | 0.5 |
| Manganous sulfate | 0.002 |
| Sodium chloride | 0.50 |
| Water | Balance | the pH thereof is adjusted to between about 6.5 and 7.5, and the medium is sterilized, after which it is cooled to room temperature, inoculated with a culture of a dextran-producing microorganism, for example, Leuconostoc mesenteroides B–512 (Northern Regional Research Laboratories classification) and incubated at 20° C. to 30° C. until a maximum yield of dextran is attained; normally a period of between 12 and 48 hours is satisfactory. The fermentate thus obtained is a thick turbid liquid.

Upon completion of the fermentation, which process renders the mass somewhat acid, that is, to a pH of 3.5–5.5 (average 4.2) calcium chloride is added to the fermentate to adjust the pH thereof to about 7.0 to 8.0. This aids in the precipitation of phosphates. Thereafter, a non-solvent precipitant for the dextran may be added to the fermentate. This precipitate may be, for instance, any organic liquid which does not dissolve dextran, such as a water-miscible lower aliphatic alcohol, e.g., methanol, ethanol or isopropanol, or a water-miscible ketone such as acetone or dioxane. The precipitant is added, usually, in an amount of 35% to 65% by volume and brings down, with the dextran, occluded and adsorbed bacteria and nitrogenous and inorganic elements. To occasion complete precipitation of the dextran it may be desirable to allow the mix to stand for a relatively long period, such as about 6 hours. The precipitated dextran may be suitably purified, dried in any suitable manner, and reduced to the particulate condition in which it may be incorporated with the ingredients of the icing. It may be drum-dried and then subdivided, spray-dried to obtain the powder directly, or it may be freeze-dried (lyophilized) in which event, also, the dried material is in a finely divided condition.

The dextran may be precipitated from the fermentate in a state of greater purity by adding an aliphatic alcohol to the fermentate at a pH between about 2.5 and 4.5. The precipitate thus obtained may be further purified by one or more reprecipitations with the alcohol.

In an alternative method of effecting synthesis of the dextran from sucrose, the microorganism, such as Leuconostoc mesenteroides B–512 may be cultivated to obtain the enzyme dextran sucrase, the culture may be filtered, and the dextran sucrase as contained in the filtrate or after isolation therefrom and as a dry powder or in the form of an aqueous solution having the desired enzyme potency, may be mixed with an aqueous solution of sucrose and the mixture maintained under appropriate pH and temperature conditions for a variable holding time and until the dextran is synthesized, after which the dextran may be precipitated and processed to a substantially pure powder.

The dextran obtained by either of these procedures has, initially, a very high average molecular weight, in the upper portion of the molecular weight range stated herein and a molecular structural repeating alpha-1,6 to non-alpha-1,6 linkages ratio of 1:18 or 1:19. Other "native" dextrans, or dextrans of comparable molecular weight and obtained by the use of other microorganisms, or the enzymes thereof, may be used. Microorganisms which may be cultured and the culture or enzyme isolated therefrom used to inoculate the sucrose bearing nutrient include the strains bearing the following NRRL designations: *Leuconostoc mesenteroides* B-119, B-1146, B-1190, B-742, B-1191, B-1196, B-1208, B-1216, B-1120, B-1144 and B-523, *Streptobacterium dextranicum* B-1254 and *Betabacterium vermiforme* B-1139.

Instead of using the "native" or high molecular weight dextran obtained as generally described above, there may be used dextrans of lower molecular weight as indicated. The dextran of lower molecular weight in the range 5,000 to $150 \times 10^6$ may be obtained by effecting the synthesis thereof from sucrose by enzyme action under conditions controlled so that the synthesis of the lower molecular weight dextran is favored. Or the lower molecular weight dextran may be obtained by hydrolyzing dextran of higher molecular weight by subjecting the latter to acid or enzyme action. So-called "clinical" dextran may be used.

The dextran may be incorporated with the icing ingredients in varying amounts such as between 0.5% and 20% by weight, based on the total weight of the icing composition. It may be mixed with the other ingredients in the dry powdered form, as a solution or dispersion in water, or in an edible oil, e.g., in soya bean, sesame or other oil. The dextrans, being pure, bland, non-irritating, non-toxic and tasteless substances which are edible without harmful physiological effect are ideally adapted to use in icings and toppings as bodying and stabilizing agents.

As indicated previously, the dextrans may be used in icings of all types containing sugar as a basic ingredient including icings which are whipped for increased volume, icings of the fat type, and simple icings of the meringue type. The following formulations, in which the parts are by weight, are illustrative of some specific icings compositions in accordance with the invention.

I

| | Percent |
|---|---|
| Water | 19.5 |
| Sugar | 73.0 |
| Dextran (aver. M.W. 20,000 to 200,000) | 7.5 |

II

| | Percent |
|---|---|
| Sugar | 71.0 |
| Water | 13.0 |
| Shortening | 14.0 |
| Salt | 0.2 |
| Flavoring | 0.4 |
| Native B-512 dextran | 1.4 |

This composition is stable, with little coalescence or separation of the fat, and has a uniform smooth texture and attractive appearance.

III

| | Percent |
|---|---|
| Sugar | 71.7 |
| Water | 20.7 |
| Egg white liquid | 2.6 |
| Dextran (average M.W. about 500,000) | 5.0 |

The consistency of the icing comprising the dextran may be similar to that of a fluid, workable paste or the composition may be thinner, and may resemble a thick or viscous liquid depending, to some extent, on the proportion of dextran present therein. These compositions may be applied to bakery products in any suitable way, as by hand or by machine, or, if the viscosity permits, by spraying.

If desired, the dextran may be used in combination with other substances which have some stabilizing effect on icings, such as alginic acid derivatives, including mixtures of a soluble alginic acid salt with a substantially insoluble alginate, for example a mixture of ammonium and calcium alginates, gel-forming alginic acid derivatives of the type obtainable by mixing a soluble alginate with a substantially insoluble metallic salt whose cation gels or precipitates the algin, as for instance the product obtained by mixing ammonium or sodium alginate with calcium citrate or calcium phosphate, with or without the addition of buffer salts of the type of sodium phosphate which assist in controlling the rate at which the soluble alginate is gelled. Such alginic acid derivatives may be premixed with the dextran in small amounts of from 0.1 to 2.0% by weight based on the combined weights of the dextran and alginic acid derivatives. Or the dextran may be used in admixture with such colloids as agar-agar, Irish moss, gelatin, gum karaya, and locust bean gum. It may also be used in combination with various surface active agents. Typical surface active agents which may be used are the mixed sulfoacetates of mono- and diglycerides of higher fatty acids, i.e., saturated fatty acids containing from 8 to 18 carbon atoms, and especially the sulfoacetates of mono- and diglycerides of stearic acid, mixtures of the sorbitan esters of the higher fatty acids with the polyoxy-ethylene derivatives of such esters, i.e., the commercially available "Spans" or "Tweens," and one or a mixture of the polyoxyethylene derivatives of stearic acid. The surface active agents may be used in amounts between 0.1% and 2.0% by weight of the total additive weight (that is, the total weight of the dextran plus the surface active agent and such other ancillary stabilizer as may be present) and may be, if desired, premixed with the dextran prior to incorporating the latter with the basic ingredients of the icing. Other edible surface active agents in addition to those specifically mentioned may be incorporated with the icing, also.

Instead of mixing a dextran as described herein with the icing, suitable edible, physiologically harmless dextran derivatives may be employed as the stabilizing and bodying or suspending agent for the basic icing ingredients, and among these the carboxy alkyl and hydroxyalkyl ethers of dextran in which the alkyl group may contain from 1 to 5 carbons, are particularly advantageous. Preferred ethers are the carboxymethyl and hydroxyethyl ethers having an average D.S. (degree of substitution or ratio of ether groups to anhydroglucopyranosidic units) of from less than 1.0 to about 3.0, that is the ethers containing an average of from less than 1.0 to about 3.0 carboxymethyl or hydroxyethyl groups per anhydroglucopyranosidic unit. The ethers may be used in amounts about the same as those in which the dextran itself is used and result in moist but firm and stable icings of excellent texture, appearance and keeping quality. Formulae IV and V below are exemplary of icing compositions comprising the dextran ethers.

IV

| | Percent |
|---|---|
| Sugar | 73.0 |
| Water | 20.0 |
| Carboxymethyl dextran (D.S. 2.9) from dextran of average M.W. 20,000 to 200,000 | 7.0 |

V

| | |
|---|---|
| Sugar | 71.0 |
| Water | 13.0 |
| Shortening | 12.0 |
| Salt | 0.2 |
| Flavoring | 0.4 |
| Hydroxyethyl dextran (D.S. 1.5) from native B-512 dextran | 3.4 |

One of the advantages of the present icings, of which sugar is a major constituent, is the fact that the dextrans having properties as set forth herein, and especially those having a high percentage of molecular structural repeating alpha-1,6 linkages, and preferably those in which the ratio of alpha-1,6 linkages to non-alpha-1,6 linkages ratio is from 10:1 to 30:1, exhibit, especially when regularly ingested, even in relatively small amounts, a definite tendency to prevent or limit gain in body weight resulting from the absorption and assimilation of food nutrients. The alpha-1,6 linkages of these dextrans tend to resist degradation by enzymes and bacteria existing in the gastro-intestinal tract and, being large-molecule substances which exert a definite osmotic pressure, are resistant to depolymerization and but slowly metabolized, tend to retain their initial molecular size and to retard the absorption and assimilation of food nutrients. Biological tests have shown that when these dextrans are eaten as a part of the regular diet, the body weight tends to remain substantially stable. Since the icings comprise substantial amounts of sugar and are normally fattening, the advantage to be derived from the presence of the dextran therein is apparent, particularly for those individuals who indulge in sweets of the kind which carry an icing or sugar-containing topping.

It may be preferred to use a dextran having a molecular weight at or near the lower limit of the range 5000 to $150 \times 10^6$, such as from 5000 to 50,000. That product may, advantageously, be the low molecular weight fraction normally discarded in the production of "clinical" dextran by fractional precipitation of the high molecular weight or native dextran, using an organic solvent such as a water-miscible aliphatic alcohol, e.g., ethanol, methanol or isopropanol, or ketone such as acetone or dioxane, as the precipitant. Or it may be the low molecular weight fraction obtained by "fractional solution" of the native dextran. This low molecular weight dextran (5000 to 50,000) may be substituted in any of the formulae given herein, or it may be used in admixture, for example in equal parts by weight, with the dextrans specifically shown in the formulae, a corresponding reduction in the quantity of the dextrans illustrated being made.

Various changes and modifications may be made in preparing the icings or toppings of the invention. Since such variations may be made in the details given herein without departing from the spirit and scope of this disclosure, it is to be understood that it is not intended to limit the invention except as it is defined in the appended claims.

What is claimed is:

1. An icing for bakery products comprising sugar and, as a stabilizing and bodying additive, a relatively small but effective quantity of a hydroxyalkyl dextran containing an average of from less than 1.0 to about 3.0 hydroxyalkyl groups per anhydroglucopyranosidic unit, and the dextran being of the strain Leuconostoc mesenteroides NRRL B-512.

2. An icing for bakery products comprising sugar and, as a stabilizing and bodying additive, a relatively small but effective quantity of hydroxyethyl dextran containing an average of from less than 1.0 to 3.0 hydroxyethyl groups per anhydroglucopyranosidic unit, and the dextran being of the strain Leuconostoc mesenteroides NRRL B-512.

3. An icing for bakery products comprising a mixture of sugar, water, and, as a stabilizing and bodying additive, a small but effective quantity of hydroxyethyl dextran, and the dextran being of the strain Leuconostoc mesenteroides NRRL B-512.

4. An icing for bakery products comprising a mixture of sugar, water, and, as a stabilizing and bodying additive, a small but effective quantity of a hydroxyethyl dextran, and the dextran being of the strain Leuconostoc mesenteroides NRRL B-512.

5. As an additive for icings for bakery products, a hydroxyalkyl dextran derived from a dextran having a molecular weight of 5,000 to $150 \times 10^6$, determined by light scattering measurements, and a molecular structural repeating alpha-1,6 to non-alpha-1,6 linkages ratio of 1.9:1 to 30:1, and the dextran being of the strain Leuconostoc mesenteroides NRRL B-512.

6. As an additive for icings for bakery products, a hydroxyethyl dextran derived from a dextran having a molecular weight of 5,000 to $150 \times 10^6$, as determined by light scattering measurements, and a molecular structural repeating alpha-1,6 to non-alpha-1,6 linkages ratio of 1.9:1 to 30:1, and the dextran being of the strain Leuconostoc mesenteroides NRRL B-512.

7. As an additive for icings for bakery products, a hydroxyalkyl dextran derived from a dextran having a molecular weight of 5,000 to $150 \times 10^6$, determined by light scattering measurements, and a molecular structural repeating alpha-1,6 to non-alpha-1,6 linkages ratio of 1.9:1 to 30:1, and the dextran being of the strain Leuconostoc mesenteroides NRRL B-512.

8. An additive for icing for bakery products, comprising sugar and, as a stabilizing and bodying additive, a hydroxyethyl dextran derived from a dextran having a molecular weight of 5,000 to $150 \times 10^6$, determined by light scattering measurements, and a molecular structural repeating alpha-1,6 to non-alpha-1,6 linkages ratio of 1.9:1 to 30:1, and the dextran being of the strain Leuconostoc mesenteroides NRRL B-512.

9. A non-fattening icing for use on bakery products comprising as a stabilizing and bodying additive, a hydroxyethyl dextran and derived from dextran having a molecular weight between 5000 and 50,000, as determined by light scattering measurements, and the dextran being of the strain Leuconostoc mesenteroides NRRL B-512.

References Cited in the file of this patent
UNITED STATES PATENTS

| | | |
|---|---|---|
| 2,089,217 | Mahoney | Aug. 10, 1937 |
| 2,409,816 | Wadsworth et al. | Oct. 22, 1946 |
| 2,474,019 | Steiner | June 21, 1949 |
| 2,602,082 | Owen | July 1, 1952 |
| 2,609,368 | Gaver | Sept. 2, 1952 |
| 2,789,911 | Toulmin | Apr. 23, 1957 |